E. A. ANDERSON.
SHOVEL.
APPLICATION FILED JAN. 15, 1914.

1,146,609.

Patented July 13, 1915.

Witnesses.

Inventor:
Emil A Anderson.
by: Attorney.

UNITED STATES PATENT OFFICE.

EMIL A. ANDERSON, OF SWEA CITY, IOWA.

SHOVEL.

1,146,609.   Specification of Letters Patent.   Patented July 13, 1915.

Application filed January 15, 1914. Serial No. 812,234.

*To all whom it may concern:*

Be it known that I, EMIL A. ANDERSON, a citizen of the United States, residing at Swea City, in the county of Kossuth and State of Iowa, have invented a new and useful Improvement in Shovels, of which the following is a specification.

The object of this invention is to provide an improved shovel which is particularly although not exclusively adapted for lifting moist sticky earth.

In the digging of ditches for draining land, heavy moist earth is frequently encountered and it has been found extremely difficult to dig by hand by the use of shovels because the earth tends to adhere to the shovel making it laborious to free the shovel from the earth after the latter has been lifted. This adhesion is caused principally by suction, air not being admitted freely between the surface of the shovel and the earth thereon.

It is the primary object of this invention to so construct the shovel as to admit air freely between the inner surace thereof and the earth carried thereby and also to so construct the means for admitting the air as to prevent the same form closing.

Figure 1:
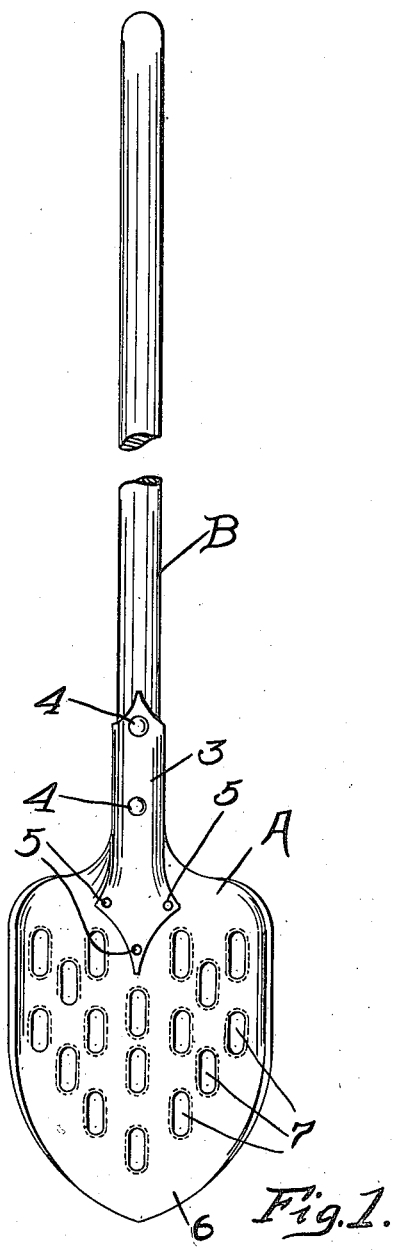
Figure 2:
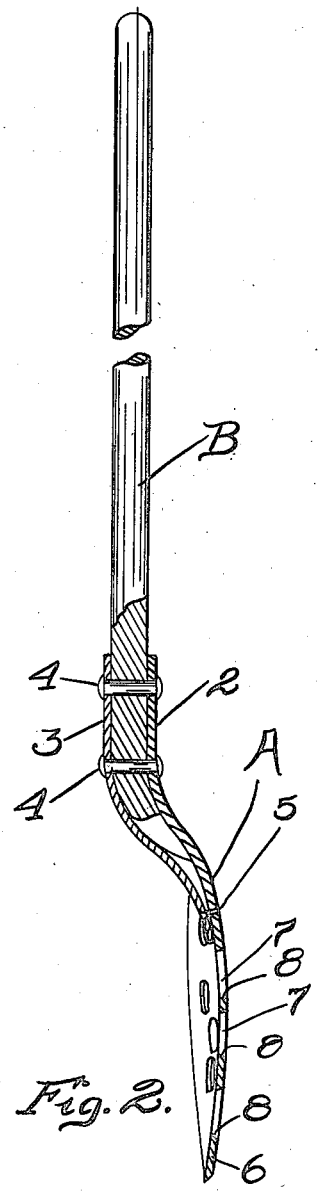

In the accompanying drawing forming part of this specification, Figure 1 is a plan of my improved shovel, a portion of the handle being broken away, and Fig. 2 is a longitudinal central section through the shovel.

In the drawing A indicates a blade of the shovel and B the handle, which is attached as usual to the b lade in a socket formed by a grooved extension 2 and a curved cleat 3, which are fastened to the handle by rivets 4, said cleat also being secured to the blade by rivets such as 5. In the design of shovel illustrated the blade has a concave inner surface and a curved pointed outer end 6. For the purpose of admitting air between the inner surface of the blade and the earth which is being lifted thereby so that said earth will traverse the blade and scour its inner surface freely when the blade is being freed from the earth, a plurality of staggered arranged openings 7 are formed in the blade and distributed substantially over its entire inner surface. These openings are elongated in a longitudinal direction so as to admit the air continuously between the earth and the inner surface of the blade while the earth is traversing the blade. Each of the openings is also formed with an angular wall 8 forming a cutting edge flush with the inner surface of the blade and receding directly to the outer surface thereof, said wall being adapted to reduce and prevent earth from closing the opening, the flaring diverging edges of all of the openings being adapted to free any earth that might otherwise clog them. Furthermore, the particular disposition of the openings over the surface of the blade hereinbefore mentioned affords a substantially continuous cutting edge throughout the length of the blade. As a result the shovel blade is freed from earth which it lifts and prevents it from adhering to its inner surface by suction and the amount of labor in digging materially reduced. The cost of this construction is practically no greater than the cost of the ordinary shovel. The shape of the shovel may be changed and the shape and construction of the openings modified within the spirit of this invention without departing from the principles applied.

In accordance with the patent statutes, I have described the principles of operation of my invention together with the apparatus which I now consider to represent the best embodiment thereof, but I desire to have it understood that the construction shown is only illustrative and that the invention can be carried out by other means and applied to uses other than those above set forth within the scope of the following claim.

Having described my invention, what I claim as new and desire to protect by Letters Patent is:—

A shovel having a blade formed with a plurality of staggered arranged perforations distributed over substantially its entire inner surface, each of said perforations being surrounded by an angular wall forming a cutting edge flush with the inner surface and receding directly therefrom to the outer surface of the blade to admit air between the surface of the blade and the earth lifted thereby and reduce the tendency of said earth as it traverses its surface adhering thereto.

In testimony whereof, I have signed my name to this specification, in the presence of two subscribing witnesses.

EMIL A. ANDERSON.

Witnesses:
O. R. ROWLEY,
C. W. PEARSON.